United States Patent
Roth et al.

(10) Patent No.: US 10,203,970 B2
(45) Date of Patent: Feb. 12, 2019

(54) DYNAMIC CONFIGURATION OF NATIVE FUNCTIONS TO INTERCEPT

(71) Applicant: AppDynamics LLC, San Francisco, CA (US)

(72) Inventors: David Roth, San Francisco, CA (US); Sanjay Nagaraj, Dublin, CA (US); Ting Liang, San Francisco, CA (US); Pankaj Kumar, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 87 days.

(21) Appl. No.: 14/928,900

(22) Filed: Oct. 30, 2015

(65) Prior Publication Data

US 2017/0123818 A1 May 4, 2017

(51) Int. Cl.
*G06F 9/448* (2018.01)
*G06F 8/41* (2018.01)
*G06F 9/445* (2018.01)

(52) U.S. Cl.
CPC ............ *G06F 9/4484* (2018.02); *G06F 8/427* (2013.01); *G06F 9/44521* (2013.01)

(58) Field of Classification Search
CPC ..... G06F 9/4484; G06F 8/427; G06F 9/44521
USPC ................................................. 717/143, 130
See application file for complete search history.

(56) References Cited

U.S. PATENT DOCUMENTS

| | | | | |
|---|---|---|---|---|
| 6,434,575 | B1 * | 8/2002 | Berry | G06F 12/0253 |
| 2004/0098707 | A1 * | 5/2004 | Tang | G06F 11/3624 |
| | | | | 717/130 |
| 2007/0283331 | A1 * | 12/2007 | Pietrek | G06F 9/4426 |
| | | | | 717/130 |
| 2014/0229921 | A1 * | 8/2014 | Arora | G06F 11/3644 |
| | | | | 717/125 |
| 2014/0365862 | A1 * | 12/2014 | Qu | G06F 17/2247 |
| | | | | 715/234 |

(Continued)

OTHER PUBLICATIONS

Hunt et al., "Intercepting and Instrumenting COM Application", 5th USENIX Conference on Object-Oriented Technologies and Systems (COOTS '99), San Diego, CA, May 3-7, 1999.*

*Primary Examiner* — S. Sough
*Assistant Examiner* — Timothy P Duncan
(74) *Attorney, Agent, or Firm* — Parker Ibrahim & Berg LLP; James M. Behmke; Stephen D. LeBarron

(57) ABSTRACT

A system implements code trampolining techniques by generating custom trampoline functions, compiling the functions, and executing the compiled functions directly from a library when the corresponding native function is called. The native functions may be binary functions, such as functions in C++ code, or other languages. A code generator may read a set of functions to be implemented and generate code, such as binary code, for the destination function. In doing so, the code generator may generate code which matches the source function signature. The generated code may then be compiled into a shared library which is loaded by the process being instrumented. When the library is initiated upon subsequent calls for the native function, the trampoline mechanisms will be set up between the source function and the generated destination function to operate seamlessly with matching signatures.

15 Claims, 6 Drawing Sheets

(56) References Cited

U.S. PATENT DOCUMENTS

| | | | |
|---|---|---|---|
| 2015/0149554 A1* | 5/2015 | Bansal | H04L 67/22 709/204 |
| 2015/0278069 A1* | 10/2015 | Arora | G06F 11/3466 717/130 |
| 2016/0078388 A1* | 3/2016 | Himmelreich | G06F 11/34 709/224 |

* cited by examiner

DYNAMIC CONFIGURATION OF NATIVE FUNCTIONS TO INTERCEPT

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application.

Web application monitoring may include modifying applications in order to determine more information about how they are performing. When dealing with a dynamic set of functions to instrument, modifying applications without introducing latency and other performance issues can be very difficult. What is needed is an improved method for modifying applications to be monitored.

SUMMARY

A system implements code trampolining techniques by generating custom trampoline functions, compiling the functions, and executing the compiled functions directly from a library when the corresponding native function is called. The native functions may be binary functions, such as functions in C++ code, or other languages. A code generator may read a set of functions to be implemented and generate code, such as binary code, for the destination function. In doing so, the code generator may generate code which matches the source function signature. The generated code may then be compiled into a shared library which is loaded by the process being instrumented. When the library is initiated upon subsequent calls for the native function, the trampoline mechanisms will be set up between the source function and the generated destination function to operate seamlessly with matching signatures.

An embodiment may include a method for monitoring and modifying a distributed business transaction. The method begins with identifying the native function to be modified on an application executing on a machine. A custom trampoline function may be generated and compiled into a shared library. A call for native function may be detected on the machine, and the compiled generated function may be executed in response to native function call.

An embodiment may include a system for monitoring and modifying a distributed business transaction. The system may include a processor, memory, and one or more modules stored in memory and executable by the processor. When executed, the modules may identify the native function to be modified on an application executing on a machine, generate a custom trampoline function, compile the generated function into a shared library, detect a call for native function on the machine, and execute the compiled generated function in response to native function call.

DETAILED DESCRIPTION

One way to implement a native agent without requiring an application to be recompiled is to use a technique called trampolining. In trampolining, a function to be instrumented jumps to a different function inserted within that function, is executed, and then jumps back to the original function. For this to work, both the source and destination functions need to have identical signatures. This is not complicated if it is known what function to install the trampolines on at compile time, as the signatures can be manually generated to match the source functions and then linked in. However, with a dynamic set of functions instrument, trampolining can be very difficult and it is not trivial to have identical signatures.

A system implements code trampolining techniques by generating custom trampoline functions, compiling the functions, and executing the compiled functions directly from a library when the corresponding native function is called. The native functions may be binary functions, such as functions in C++ code, or other languages. A code generator may read a set of functions to be implemented and generate code, such as binary code, for the destination function. In doing so, the code generator may generate code which matches the source function signature. The generated code may then be compiled into a shared library which is loaded by the process being instrumented. When the library is initiated upon subsequent calls for the native function, the trampoline mechanisms will be set up between the source function and the generated destination function to operate seamlessly with matching signatures.

Figure 1:
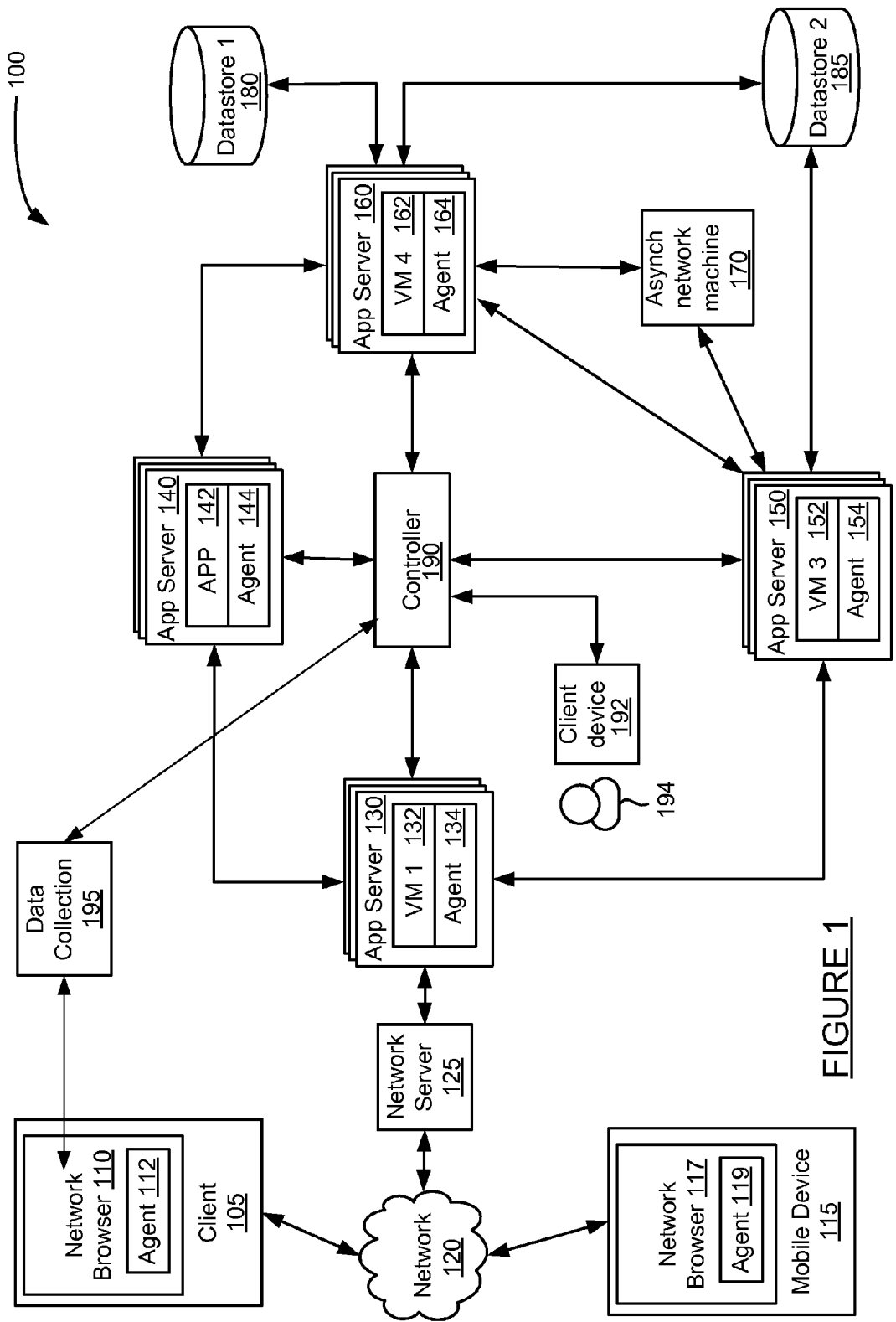
FIG. 1 is a block diagram of a system for monitoring applications.

FIG. 1 is a block diagram of a system for monitoring a distributed business transaction. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor code, and transmit data to data collection server (e.g., App Server 160), controller 190, or another device. Agent 112 may perform other operations related to monitoring a request or a network at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Mobile device may also include client applications and other code that may be monitored by agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server (e.g., App Server 160) and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120. Network server 125 may be implemented as one or more servers implementing a network service, and may be implemented on the same machine as application server 130 or one or more separate machines. When network 120 is the Internet, network server 123 may he implemented as a web server.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as including a Java, PHP, .Net, and Node.JS, be implemented as a Java virtual machine, or include some other host type. Application server 130 may also include one or more agents 134 (i.e. "modules"), including a language agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the socket and capture packets coming over the socket.

In some embodiments, server 130 may include applications and/or code other than a virtual machine. For example, servers 130, 140, 150, and 160 may each include Java code, .Net code, PHP code, Ruby code, C code, C++ or other binary code to implement applications and process requests received from a remote source. References to a virtual machine with respect to an application server are intended to be for exemplary purposes only.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a or a virtual machine 132 (or other program language, such as a PHP, .Net, or C program), machine resources, network layer data, and communicate with byte instrumented code on application server 130 and one or more applications on application server 130.

Each of agents 134, 144, 154 and 164 may include one or more agents, such as a language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent 220 may collect flow data as well as data associated with the execution of a particular application. The language agent may instrument the lowest level of the application to gather the flow data. The flow data may indicate which tier is communicating which with which tier and on which port. In some instances, the flow data collected from the language agent includes a source IP, a source port, a destination IP, and a destination port. The language agent may report the application data and call chain data to a controller. The language agent may report the collected flow data associated with a particular application to network agent 230.

A network agent may be a standalone agent that resides on the host and collects network flow group data. The network flow group data may include a source IP, destination port, destination IP, and protocol information for network flow received by an application on which network agent 230 is installed. The network agent 230 may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then reports the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 210 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application Ser. No. 12/878,919, titled "Monitoring Distributed Web Application Transactions," filed on Sep. 9, 2010, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular each application may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as a content page, e.g., a web page, which may be provided to and rendered through a network browser application on client device 192.

Applications 132, 142, 152 and 162 may be any of several types of applications. Examples of applications that may implement applications 132-162 include a Java, PHP, .Net, Node.JS, and other applications.

Figure 2:
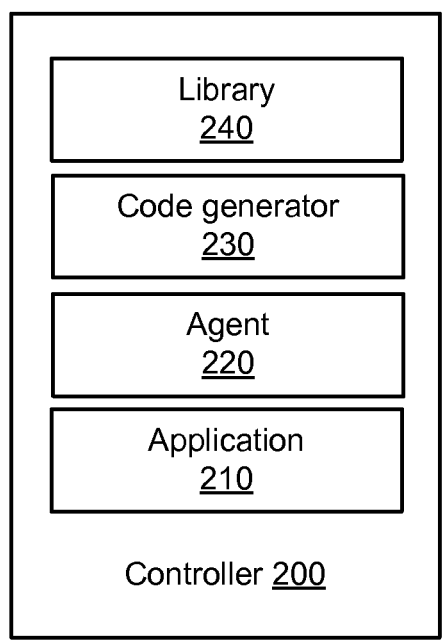
FIG. 2 is a block diagram of a controller.

FIG. 2 is a block diagram of a controller. The controller FIG. 2 may be used to implement controller 190 in the system of FIG. 1. Controller 200 of FIG. 2 includes application 210, agent 220, code generator 230, and library 240. Agent 220 may monitor application 210. When there is a native function to be modified within application 210, agent 220 may access the native function and initiate generation of a custom trampoline function. In particular, agent 220 may start code generator 230 to generate a custom trampoline function and compile the generated function. Once code generator compiles the function, it is placed in library 240. Subsequently, when agent 220 determines that the native function is called, the generated function that is compiled and placed in library 240 will be retrieved in place of the call native function and executed as part of application 210.

Figure 3:
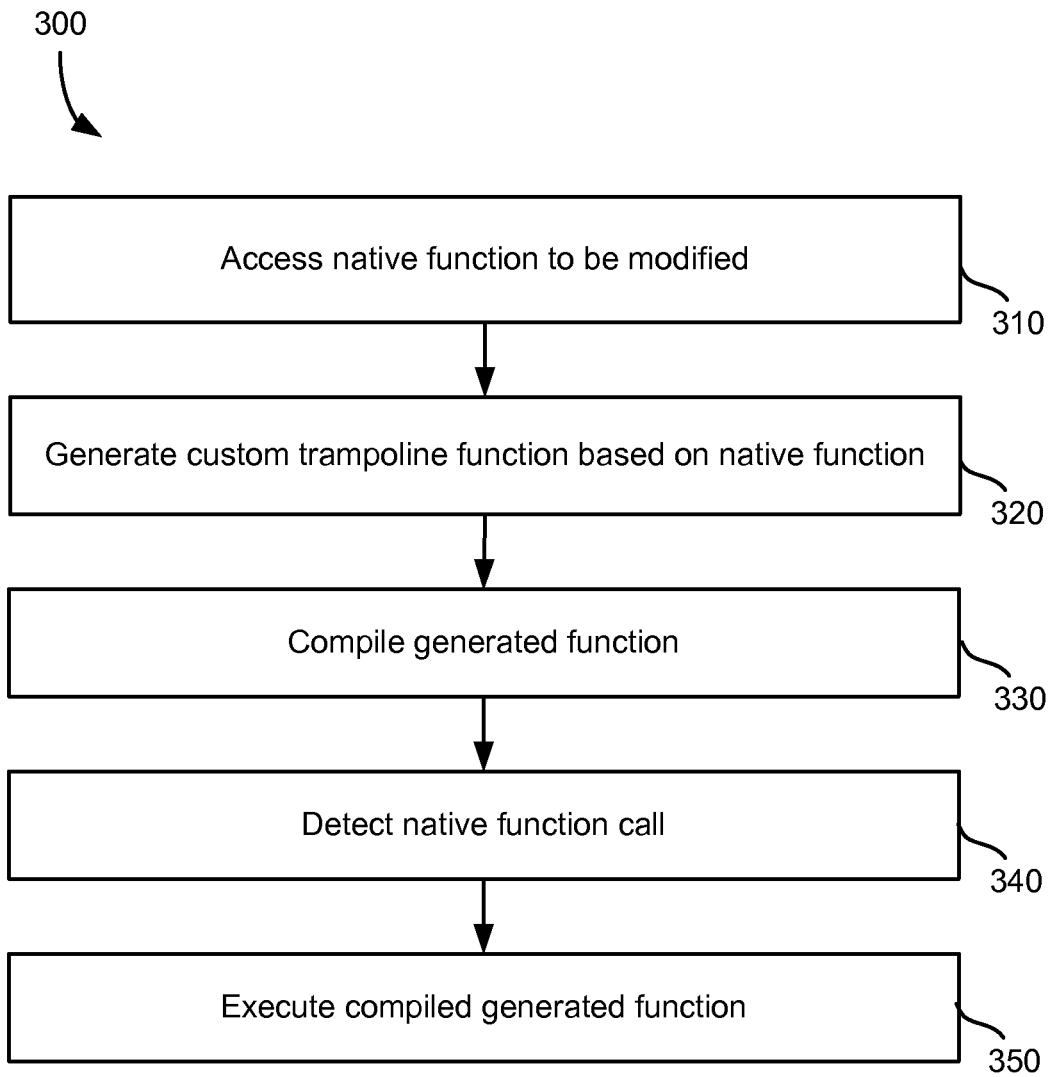
FIG. 3 is a method for implementing trampoline mechanisms in native binary code.

FIG. 3 is a method for implementing trampoline mechanisms in native binary code. First, a native function to be modified is identified at step 310. The function may be identified by an administrator, by an agent or controller as a function that is performing poorly and should be tracked, or based on other criteria. Once identified, a custom trampoline function may be generated for the native function at step 320. The custom trampoline function may be generated by a code generator and may include parsing the function, retrieving function data from different sources, and then generating the custom trampoline function. More details related to generating a custom trampoline function are discussed with respect to the method of FIG. 4.

The generated function is compiled at step 330. The function may be compiled at runtime and loaded into a shared library. When the native function is called, the custom trampoline function may be called in its place and may be executed. Part of the execution of the trampoline function will include calling the native function to be executed, as well as pre-operations and post operations to be performed before and after execution of the native function.

A native function call may be detected at step 340. The call the native function may be detected by the agent located on the application which receives the native function call. The agent may detect the call by segments of code placed within the application, the operating system on which the application resides, or other mechanisms used to detect function calls.

The compiled generated function is executed in response to detecting the native function call at step 350. Executing the compile generated function may include loading a library, providing the compiled generated function in response the call, and executing the function. More detail for executing a compiled generated function is discussed with respect to the method of FIG. 5.

Figure 4:
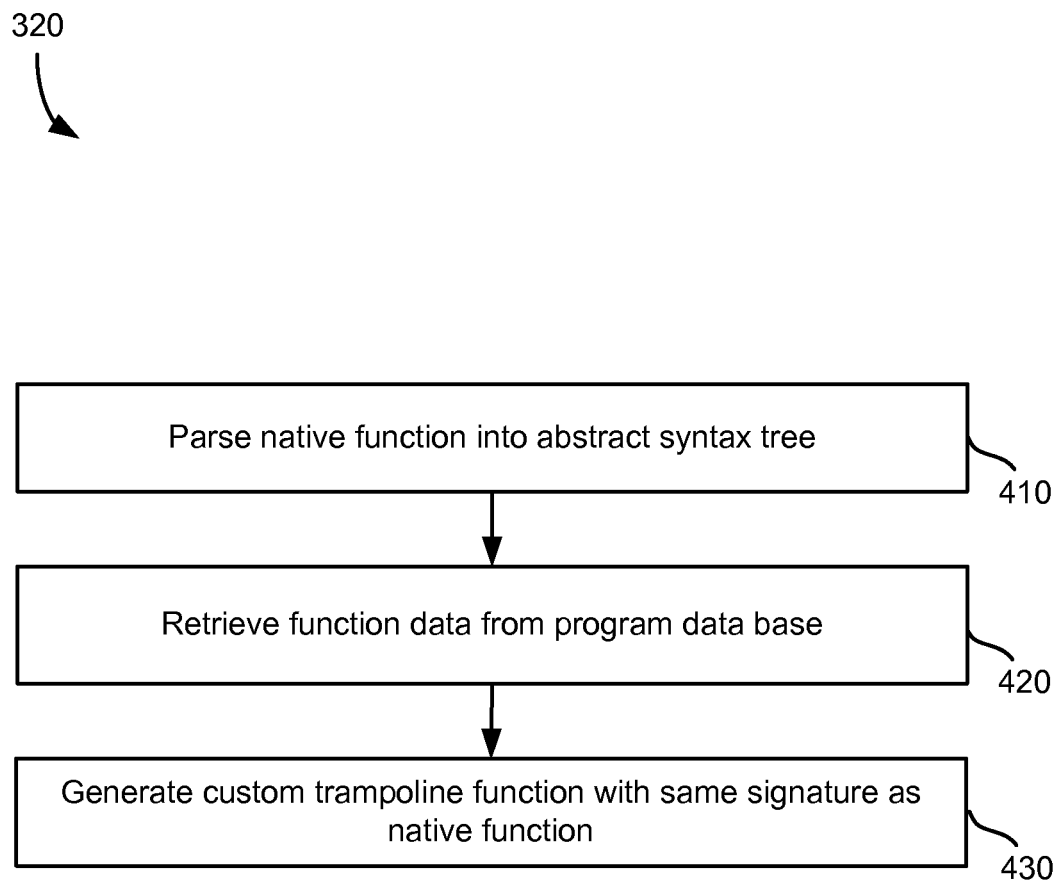
FIG. 4 is a method for generating custom trampoline functions.

FIG. 4 is a method for generating a custom trampoline function. The method of FIG. 4 provides more detail for step 320 of the method FIG. 3. First, a native function is parsed into an abstract syntax tree at step 410. Function data may then be retrieved at step 420. The function data may be retrieved from a program database, which typically includes debugging information for a particular function. Other data may also be retrieved for the function, such as for example from portions of code that retrieve information about a function size, parameters, and other data. The data retrieved may be used to ensure that the generated function maintains the same signature as the native function.

Next, the generated custom trampoline function is generated with the same signature as the native function at step 430. The generated custom trampoline function will include a trampoline mechanism to jump to the native function, as well as one or more steps either before the jump to the native function, after the jump to the native function, or both. In this way, functionality may be added to the native function without requiring compile nation of the application as a whole.

Figure 5:
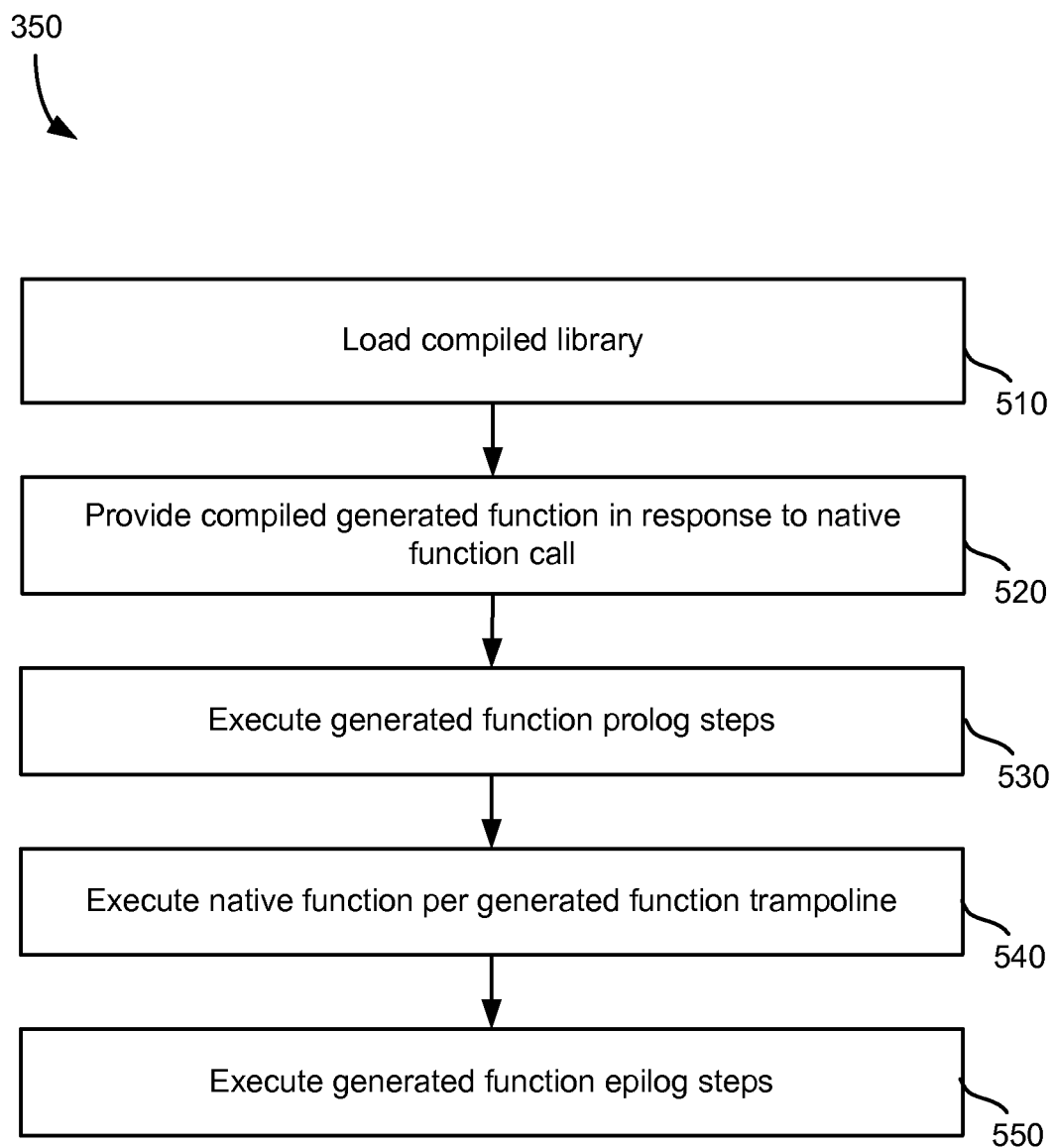
FIG. 5 is a method for executing compiled generated functions.

FIG. 5 is a method for executing a compiled generated function. The method of FIG. 5 provides more detail for step 350 of the method of FIG. 3. First, compile library is loaded at step 510. The library is loaded in response to detecting a call for the native function identified at step 310 of the method of FIG. 3. Next, the compile the generated function is provided in response to the native function call at step 520. This may be performed by modifying the library, an object loader within the application, or other code that retrieves functions to be executed from the library.

The generated function may include prolog and epilog steps performed before and after the native function itself is generated. A pseudo code example of a generated function is below.

```
int custom_func(char* p0, int p1) {
    // do custom prolog steps such as param
    extraction, exception handling etc
    int ret = func(p0, p1);
    // do custom epilog steps
    return ret;
}
```

Generated function prolog steps are executed at step 530. The prolog steps are performed before the native function is called within the generated function. The native function may then be executed within the generated function at step 540. The native function is generated by trampoline mechanism which jumps to the native function from the generated function. Once the native function execution is complete, execution jumps back to the generated function. Once the native function is complete, generated function epilog steps may be executed at step 550. The epilog steps are performed after execution of the native function is complete.

The prolog and epilog steps may specify one or more functions to perform before or after the native function itself. For example, if a particular native function is to be logged, the prolog function may collect a start time stamp and the epilog may collect an end time stamp, thereby indicating the total execution time of the native function.

Figure 6:
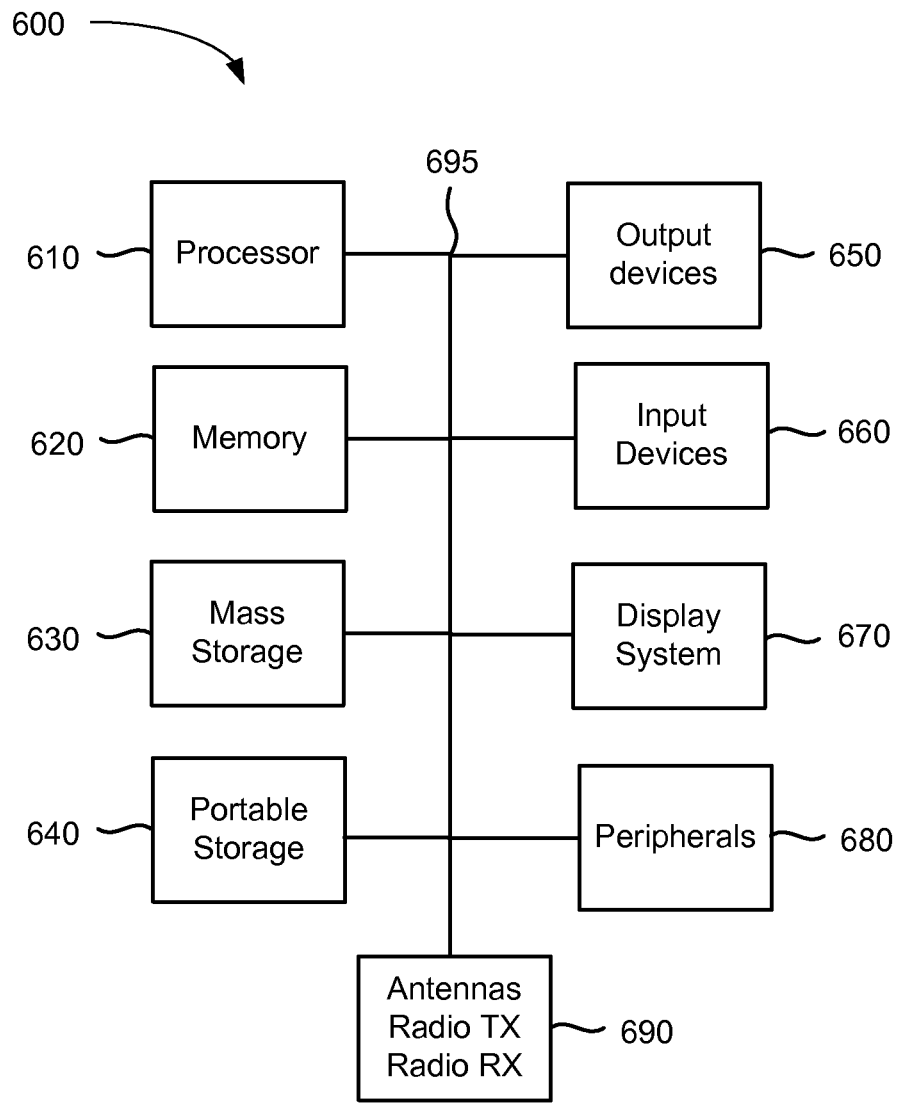
FIG. 6 is a block diagram of a computing environment for implementing the present technology.

FIG. 6 is a block diagram of a system for implementing the present technology. System 600 of FIG. 6 may be implemented in the contexts of the likes of client computer 105 and 192, servers 125, 130, 140, 150, and 160, machine 170, data stores 180 and 190, and controller 190. The computing system 600 of FIG. 6 includes one or more processors 610 and memory 620. Main memory 620 stores, in part, instructions and data for execution by processor 610. Main memory 620 can store the executable code when in operation. The system 600 of FIG. 6 further includes a mass storage device 630, portable storage medium drive(s) 640, output devices 650, user input devices 660, a graphics display 670, and peripheral devices 680.

The components shown in FIG. 6 are depicted as being connected via a single bus 695. However, the components may be connected through one or more data transport means. For example, processor unit 610 and main memory 620 may be connected via a local microprocessor bus, and the mass storage device 630, peripheral device(s) 680, portable storage device 640, and display system 670 may be connected via one or more input/output (I/O) buses.

Mass storage device 630, which may be implemented with a magnetic disk drive, an optical disk drive, a flash drive, or other device, is a non-volatile storage device for storing data and instructions for use by processor unit 610. Mass storage device 630 can store the system software for implementing embodiments of the present invention for purposes of loading that software into main memory 620.

Portable storage device 640 operates in conjunction with a portable non-volatile storage medium, such as a floppy disk, compact disk or Digital video disc, USB drive, memory card or stick, or other portable or removable memory, to input and output data and code to and from the computer system 600 of FIG. 6. The system software for implementing embodiments of the present invention may be stored on such a portable medium and input to the computer system 600 via the portable storage device 640.

Input devices 660 provide a portion of a user interface. Input devices 660 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 600 as shown in FIG. 6 includes output devices 650. Examples of suitable output devices include speakers, printers, network interfaces, and monitors.

Display system 670 may include a liquid crystal display (LCD) or other suitable display device. Display system 670 receives textual and graphical information, and processes the information for output to the display device. Display system 670 may also receive input as a touch-screen.

Peripherals 680 may include any type of computer support device to add additional functionality to the computer system. For example, peripheral device(s) 680 may include a modem or a router, printer, and other device.

The system of 600 may also include, in some implementations, antennas, radio transmitters and radio receivers 690.

The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a BLUETOOTH® devices, and other radio frequency networks. The devices may include one or more radio transmitters and receivers for processing signals sent and received using the antennas.

The components contained in the computer system 600 of FIG. 6 are those typically found in computer systems that may be suitable for use with embodiments of the present invention and are intended to represent a broad category of such computer components that are well known in the art. Thus, the computer system 600 of FIG. 6 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including UNIX®, LINUX®, WINDOWS®, iOS®, ANDROID®, C, C++, Node.JS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for modifying a native function, comprising:
   receiving monitored data from an agent executed by a machine, the monitored data associated with one or more native functions within an application executed by the machine;
   identifying a native function of the one or more native functions to be modified based on the received monitored data from the agent;
   in response to identifying the native function to be modified, generating, by a code generator, a custom trampoline function that modifies the native function by retrieving data that includes a function size of the native function from a program data base, the retrieved data used to ensure a signature of the native function matches a signature of the generated custom trampoline function, wherein the native function is parsed into an abstract syntax tree;
   compiling, by the code generator, the generated custom trampoline function;
   placing the compiled generated custom trampoline function into a library;
   when the native function to be modified is subsequently called by the application, loading the library and supplementing the native function with the compiled generated custom trampoline function from the library; and
   providing the compiled generated custom trampoline function to the machine for execution.

2. The method of claim 1, wherein monitoring one or more native functions within an application includes:
   tracking, by the agent, performance of the one or more native functions; and
   determining, by the agent, the native function needs to be modified based on the native function performing poorly.

3. The method of claim 1, wherein generating the custom trampoline function includes:
   generating, by the code generator, a function signature for the custom trampoline function that matches a function signature associated with the native function.

4. The method of claim 1, wherein the generated custom trampoline function is compiled dynamically during runtime by the code generator on the machine.

5. The method of claim 1, wherein the complied generated custom trampoline function includes prolog steps and epilog steps that are performed before and after the native function respectively.

6. A non-transitory computer readable storage medium having embodied thereon a program, the program being executable by a processor to perform a method for monitoring and modifying a business transaction, the method comprising:
   receiving monitored data from an agent executed by a machine, the monitored data associated with one or more native functions within an application executed by the machine;
   identifying a native function of the one or more native functions to be modified based on the received monitored data from the agent;
   in response to identifying the native function to be modified, generating, by a code generator, a custom trampoline function that modifies the native function by retrieving data that includes a function size of the native function from a program data base, the retrieved data used to ensure a signature of the native function matches a signature of the generated custom trampoline function, wherein the native function is parsed into an abstract syntax tree;
   compiling, by the code generator, the generated custom trampoline function;
   placing the compiled generated custom trampoline function into a library;
   when the native function to be modified is subsequently called by the application, loading the library and supplementing the native function with the compiled generated custom trampoline function from the library; and
   providing the compiled generated custom trampoline function to the machine for execution.

7. The non-transitory computer readable storage medium of claim 6, wherein monitoring one or more native functions within an application includes:
   tracking, by the agent, performance of the one or more native functions; and
   determining, by the agent, the native function needs to be modified based on the native function performing poorly.

8. The non-transitory computer readable storage medium of claim 6, wherein generating the custom trampoline function includes:
   generating, by the code generator, a function signature for the custom trampoline function that matches a function signature associated with the native function.

9. The non-transitory computer readable storage medium of claim 6, wherein the generated custom trampoline function is compiled dynamically during runtime as the code generator.

10. The non-transitory computer readable storage medium of claim 6, wherein the complied generated custom trampoline function includes prolog steps and epilog steps that are performed before and after the native function respectively.

11. A system for monitoring and modifying a business transaction, comprising:
- a server including a memory and a processor; and
- one or more modules stored in the memory and executed by the processor, the processor when executed configured to:
  - receive monitored data from an agent executed by a machine, the monitored data associated with one or more native functions within an application executed by the machine,
  - identify a native function to be modified from the one or more monitored native functions within the application,
  - in response to identifying the native function to be modified, generate, as a code generator on the server, a custom trampoline function that modifies the native function by retrieving data that includes a function size of the native function from a program data base, the retrieved data used to ensure a signature of the native function matches a signature of the generated custom trampoline function, wherein the native function is parsed into an abstract syntax tree,
  - compile the generated custom trampoline function;
  - place the compiled generated custom trampoline function into a library,
  - when the native function to be modified is subsequently called by the application, supplementing the native function with the compiled generated custom trampoline function from the library, and
  - provide the compiled generated custom trampoline function to the machine for execution.

12. The system of claim 11, wherein when the processor monitors the one or more native functions, the processor is further configured to:
- track performance of the one or more native functions; and
- determine the native function needs to be modified based on the native function performing poorly.

13. The system of claim 11, wherein the custom trampoline function is generated by a code generator executing as one of the one or more modules, the code generator configured to:
- generate a function signature for the custom trampoline function that matches a function signature associated with the native function.

14. The system of claim 11, wherein the generated customer trampoline function is compiled dynamically during runtime as the code generator.

15. The system of claim 11, wherein the complied generated custom trampoline function includes prolog steps and epilog steps that are performed before and after the native function respectively.

* * * * *

UNITED STATES PATENT AND TRADEMARK OFFICE
CERTIFICATE OF CORRECTION

PATENT NO.       : 10,203,970 B2
APPLICATION NO.  : 14/928900
DATED            : February 12, 2019
INVENTOR(S)      : David Roth et al.

Page 1 of 1

It is certified that error appears in the above-identified patent and that said Letters Patent is hereby corrected as shown below:

In the Specification

In Column 3, Line 34, please amend as shown:
Internet, network server 125 may be implemented as a web In Column 7, Line 12, please amend as shown:
the compiled generated function may include loading a In Column 7, Line 43, please amend as shown:
method of FIG. 3. Next, the compiled generated function Signed and Sealed this
Fourteenth Day of January, 2020

Andrei Iancu
*Director of the United States Patent and Trademark Office*